US011599231B2

(12) United States Patent
Lee et al.

(10) Patent No.: US 11,599,231 B2
(45) Date of Patent: Mar. 7, 2023

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Cheol-Hun Lee, Gyeonggi-do (KR); Do-Hyoung Kwon, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/675,124

(22) Filed: Feb. 18, 2022

(65) Prior Publication Data

US 2022/0269374 A1 Aug. 25, 2022

(30) Foreign Application Priority Data

Feb. 22, 2021 (KR) ........................ 10-2021-0023665

(51) Int. Cl.
*G06F 3/044* (2006.01)
*G06F 3/041* (2006.01)

(52) U.S. Cl.
CPC .......... *G06F 3/0445* (2019.05); *G06F 3/0448* (2019.05); *G06F 3/04164* (2019.05)

(58) Field of Classification Search
CPC ... G06F 3/0445; G06F 3/04164; G06F 3/0448
USPC .......................................................... 345/173
See application file for complete search history.

(56) References Cited

U.S. PATENT DOCUMENTS

2010/0302201 A1* 12/2010 Ritter .................... G06F 3/0446 345/174
2014/0055688 A1 2/2014 Petcavich
2016/0048248 A1* 2/2016 Na ......................... G09G 5/003 345/174
2016/0070395 A1* 3/2016 Hung .................... G06F 3/0412 345/173
2019/0189699 A1* 6/2019 Ye ....................... H01L 51/5253
2020/0337157 A1* 10/2020 Ariumi ................ H01Q 9/0407

FOREIGN PATENT DOCUMENTS

JP 2007240670 A * 9/2007
KR 10-2014-0092366 A 7/2014

* cited by examiner

*Primary Examiner* — Mark Edwards
(74) *Attorney, Agent, or Firm* — Venable LLP

(57) ABSTRACT

The present disclosure relates to a touch sensor including: a first electrode layer including a first main electrode and a first auxiliary electrode formed to be spaced apart from the first main electrode; a second electrode layer including a second main electrode and a second auxiliary electrode formed to be spaced apart from the second main electrode; and an insulating layer positioned between the first electrode layer and the second electrode layer and provided with a contact hole, in which one or more of the first electrode layer and the second electrode layer have a line width of an electrode pattern region corresponding to the contact hole larger than the contact hole, and an image display device including the same.

14 Claims, 19 Drawing Sheets

10
20
22
21
23
10
31
30
32

TOUCH SENSOR AND IMAGE DISPLAY DEVICE INCLUDING THE SAME

CROSS-REFERENCE TO RELATED APPLICATION

This application claims priority to Korean Patent Application No. 10-2021-0023665, filed on Feb. 22, 2021, which is incorporated herein by reference in its entirety.

BACKGROUND

Field of the Disclosure

The present disclosure relates to a touch sensor and an image display device including the same.

Description of Related Art

As an information technology develops in recent years, various input devices are also being developed together, and a personal computer, a portable transmittance device, and other personal information processing devices perform a text and graphic processing using various input devices such as a keyboard and a mouse.

However, with the rapid development of the information society, there is a problem in that it is difficult to efficiently drive a product using only the keyboard and the mouse, which serve as the conventional input device. Therefore, there increases a need for a device that is simple and has fewer erroneous operations, and that allows anyone to easily input information.

In addition, a technology related to the input device goes beyond the level of satisfying a general function, and interest is changing to high reliability, durability, innovation, design, and processing-related technology. To achieve this purpose, a touch sensor has been developed as an input device capable of easily inputting information such as texts and graphics.

The touch sensor is an input device that is added to or designed to be embedded in a display device such as a liquid crystal display (LCD), a plasma display panel (PDP), an organic light emitting diode (OLED), or an active matrix organic light emitting diode (AMOLED), and is a device that recognizes an object as an input signal when the object such as a finger or a touch pen is in contact with a screen. Recently, this touch sensor is mainly used in mobile devices such as a mobile phone and a portable multimedia player (PMP), or a smart phone, and is also used in many industrial fields such as a navigation device, a netbook, a notebook, a digital information device (DID), a desktop computer using a touch input support operating system, an Internet protocol TV (IPTV), a cutting-edge fighter, a tank, and an armored vehicle.

For example, as in Korean Patent Application Laid-Open No. 10-2014-0092366, a touch screen panel in which a touch sensor is coupled to various image display devices is being developed.

Meanwhile, the touch sensor may have a plurality of electrodes including a conductive material such as metal arranged on a substrate to recognize a signal by a user's touch. The conventional touch sensor has been manufactured in the method for forming a plurality of driving electrodes and sensing electrodes on the same layer, directly connecting any one electrode, and connecting the other electrode using a bridge electrode.

However, the touch sensor including the bridge electrode has a problem in that the bridge electrode is visually recognized by the user, and to solve this problem, the touch sensor that does not use the bridge electrode has been developed by forming the driving electrode and the sensing electrode on different layers.

However, the touch sensor that does not use the bridge electrode may reduce the visibility due to the bridge electrode. However, there is a problem in that an electrode pattern is visually recognized by the user due to a difference in optical refractive indexes because the driving electrode and the sensing electrode are formed on different layers, and there is a problem in that the thickness of an insulating layer formed between the electrode layers is increased to minimize a parasitic capacitance noise. In addition, if the overlay characteristics are poor due to the misalignment, etc., reliability may be reduced due to damage to a lower substrate or an electrode during the process.

Therefore, there increases the demand for an ultra-thin type touch sensor, which implements the non-visibility of the electrode pattern, minimizes the parasitic capacitance noise, improves the reliability of the device, and minimizes the thickness of the insulating layer as well as solving the visibility problem of the bridge electrode.

The contents described in Description of Related Art are to help the understanding of the background of the present disclosure, and may include what is not previously known to those skilled in the art to which the present disclosure pertains.

RELATED ART DOCUMENT

[Patent Document]

(Patent Document 1) Korean Patent Application Laid-Open No. 10-2014-0092366

SUMMARY

An object of the present disclosure is to provide a touch sensor with improved bridge electrode visibility.

In addition, another object of the present disclosure is to provide a touch sensor with improved electrode pattern visibility.

In addition, still another object of the present disclosure is to provide a touch sensor with improved parasitic capacitance noise characteristics.

In addition, yet another object of the present disclosure is to provide a touch sensor with improved electrode channel resistance characteristics.

In addition, still yet another object of the present disclosure is to provide a touch sensor with improved reliability of a device.

In addition, another further object of the present disclosure is to provide an ultra-thin type touch sensor by minimizing the thickness of an insulating layer.

In addition, still another further object of the present disclosure is to provide an image display device including the touch sensor.

The present disclosure relates to a touch sensor including: a first electrode layer including a first main electrode and a first auxiliary electrode formed to be spaced apart from the first main electrode; a second electrode layer including a second main electrode and a second auxiliary electrode formed to be spaced apart from the second main electrode; and an insulating layer positioned between the first electrode layer and the second electrode layer and provided with a contact hole, in which one or more of the first electrode layer and the second electrode layer have a line width of an electrode pattern region corresponding to the contact hole larger than the contact hole.

According to a first aspect of the present disclosure, a line width of an electrode pattern region not corresponding to the contact hole may be smaller than or equal to the contact hole.

According to a second aspect of the present disclosure, the line width of the electrode pattern region corresponding to the contact hole may be 10 to 30 μm larger than the contact hole.

According to a third aspect of the present disclosure, the line width of the electrode pattern region corresponding to the contact hole may be 35 to 85 μm.

According to a fourth aspect of the present disclosure, a critical dimension of the contact hole may be 25 to 55 μm in a direction of the line width of the corresponding electrode pattern region.

According to a fifth aspect of the present disclosure, the contact hole may be to electrically connect at least one of a first main electrode and a second auxiliary electrode opposite thereto; and a second main electrode and a first auxiliary electrode opposite thereto.

According to a sixth aspect of the present disclosure, the first main electrode may include: a first main electrode unit pattern integrally connected by a first main electrode connection part, the first auxiliary electrode may include: a first auxiliary electrode unit pattern integrally connected by a first auxiliary electrode connection part, the second main electrode may include: a second main electrode unit pattern integrally connected by a second main electrode connection part, and the second auxiliary electrode may include: a second auxiliary electrode unit pattern integrally connected by a second auxiliary electrode connection part.

According to a seventh aspect of the present disclosure, the contact hole may be formed on at least one of a point where the first main electrode connection part and the second auxiliary electrode connection part opposite thereto intersect in a planar direction; and a point where the second main electrode connection part and the first auxiliary electrode connection part opposite thereto intersect in the planar direction.

According to an eighth aspect of the present disclosure, the first main electrode unit pattern may overlap each of second spheres defined by a plurality of adjacent second auxiliary electrode unit patterns in a planar direction, the first auxiliary electrode unit pattern may overlap each of second holes defined by a plurality of adjacent second main electrode unit patterns in the planar direction, the second main electrode unit pattern may overlap each of first spheres defined by a plurality of adjacent first auxiliary electrode unit patterns in the planar direction, and the second auxiliary electrode unit pattern may overlap each of first holes defined by a plurality of adjacent first main electrode unit patterns in the planar direction.

According to a ninth aspect of the present disclosure, the first electrode layer and the second electrode layer may include: a mesh-shaped pattern.

According to a tenth aspect of the present disclosure, the first main electrode may include: a first connection part connecting the first main electrode in a row direction, and the second main electrode may include: a second connection part connecting the second main electrode in a column direction.

According to an eleventh aspect of the present disclosure, the first electrode layer may include: a first dummy electrode formed to be spaced apart from the first main electrode and the first auxiliary electrode, and the second electrode layer may include: a second dummy electrode formed to be spaced apart from the second main electrode and the second auxiliary electrode.

According to a twelfth aspect of the present disclosure, the first dummy electrode may include: a first dummy electrode unit pattern, and the second dummy electrode may include: a second dummy electrode unit pattern.

According to a thirteenth aspect of the present disclosure, the first dummy electrode unit pattern may overlap each of second spaces defined by a plurality of adjacent second dummy electrode unit patterns in a planar direction, and the second dummy electrode unit pattern may overlap each of first spaces defined by a plurality of adjacent first dummy electrode unit patterns in the planar direction.

In addition, the present disclosure relates to an image display device including: a display panel; and a touch sensor stacked on the display panel.

According to the touch sensor according to the present disclosure, it is possible to form the driving electrode and the sensing electrode on different layers without including the bridge electrode, thereby further improving the visibility characteristics by the bridge electrode compared to the conventional touch sensor.

In addition, according to the touch sensor according to the present disclosure, it is possible to reduce the difference in the optical refractive indexes between the electrodes using the microelectrode pattern in which the spatial frequency is arranged as the high frequency component, thereby further improving the electrode pattern visibility compared to the conventional touch sensor.

In addition, according to the touch sensor according to the present disclosure, it is possible to minimize the overlap between the electrodes, and to form the contact hole in the insulating layer, thereby further improving the parasitic capacitance noise characteristics compared to the conventional touch sensor.

In addition, according to the touch sensor according to the present disclosure, it is possible to form the contact hole in the insulating layer, thereby further improving the electrode channel resistance characteristics compared to the conventional touch sensor.

In addition, according to the touch sensor according to the present disclosure, it is possible to set the line width margin in the electrode pattern region corresponding to the region where the contact hole is formed to prevent the damage to the lower substrate or the electrode due to the misalignment, thereby further improving the reliability of the device compared to the conventional touch sensor.

In addition, according to the touch sensor according to the present disclosure, it is possible to minimize the thickness of the insulating layer compared to the conventional touch sensor, thereby implementing the ultra-thin type touch sensor.

DETAILED DESCRIPTION

Figure 1A:
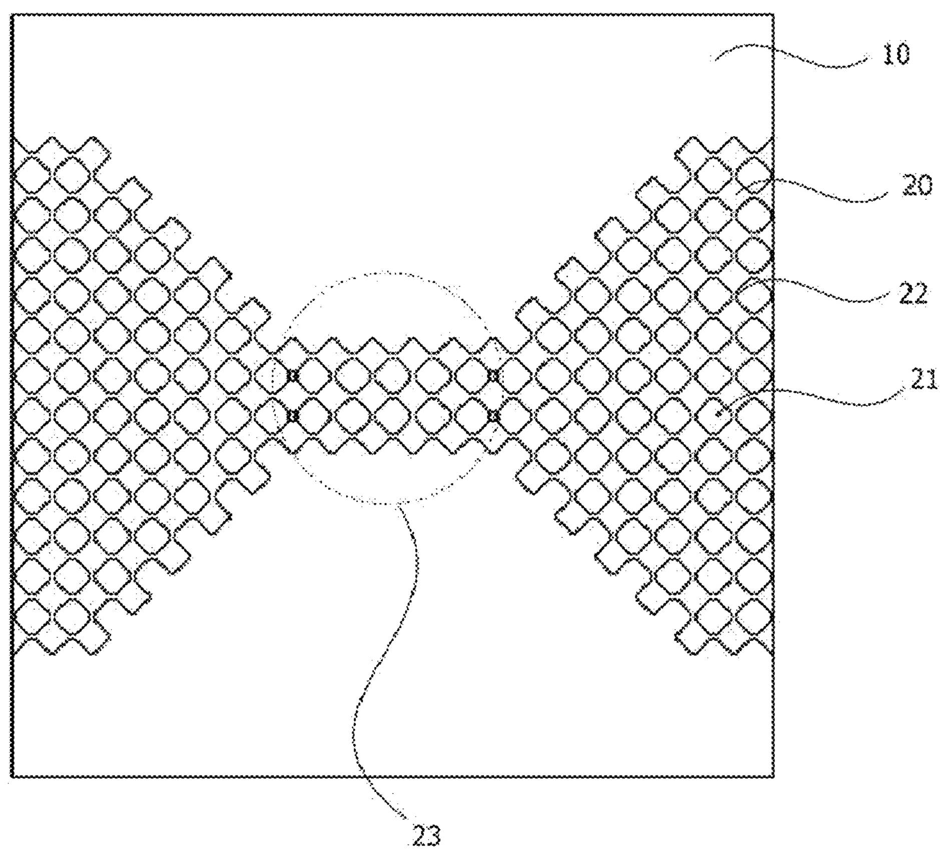
FIGS. 1A-1D are schematic plan diagrams showing a first electrode layer according to an exemplary embodiment of the present disclosure.

The present disclosure relates to a touch sensor, which forms a first electrode layer and a second electrode layer on different layers with an insulating layer interposed therebetween, thereby solving a visibility problem due to a bridge electrode, forms a contact hole in the insulating layer, thereby improving parasitic capacitance noise and electrode channel resistance characteristics, and sets a line width margin in an electrode pattern region corresponding to a region where the contact hole is formed, thereby preventing a reduction in reliability of a device due to misalignment, etc., and an image display device including the same.

More specifically, the present disclosure relates to the touch sensor, which includes: a first electrode layer including a first main electrode and a first auxiliary electrode formed to be spaced apart from the first main electrode; a second electrode layer including a second main electrode and a second auxiliary electrode formed to be spaced apart from the second main electrode; and an insulating layer positioned between the first electrode layer and the second electrode layer and provided with a contact hole, in which one or more of the first electrode layer and the second electrode layer have a line width of an electrode pattern region corresponding to the contact hole larger than the contact hole, and an image display device including the same.

Hereinafter, exemplary embodiments of the present disclosure will be described in more detail with reference to the drawings. However, since the following drawings attached to the present specification show preferred exemplary embodiments of the present disclosure and serve to further understand the technical spirit of the present disclosure together with the aforementioned content of the present disclosure, the present disclosure should not be interpreted as being limited only to the matters shown in these drawings.

The terms used in the present specification are to describe the exemplary embodiments, and are not intended to limit the present disclosure. In the present specification, the singular form also includes the plural form unless specifically stated otherwise in the phrase.

"Comprises" and/or "comprising" used in the specification are used as the meaning that does not preclude the presence or addition of one or more other components, steps, operations, and/or elements other than the mentioned components, steps, operations, and/or elements. The same components are denoted by the same reference numerals throughout the specification.

「Below」, 「bottom」, 「under」, 「above」, 「top」, and 「over」 that are spatially relative terms may be used to easily describe the correlation between one element or components and another element or components as shown in the drawings. Spatially relative terms should be understood as terms including different directions of the element during use or operation in addition to the directions shown in the drawings. For example, when the elements shown in the drawings are turned over, the element described as "below" or "under" another element may be placed "above" another element. Therefore, the exemplary term "below" may include both the bottom and top directions. The element may also be oriented in other directions, and therefore, the spatially relative terms may be interpreted depending upon the orientation.

A "planar direction" used in the present specification may be interpreted as a direction perpendicular to a first electrode layer, a second electrode layer, and/or an insulating layer, that is, a direction viewed from the user's side.

<Touch Sensor>

Figure 2A:
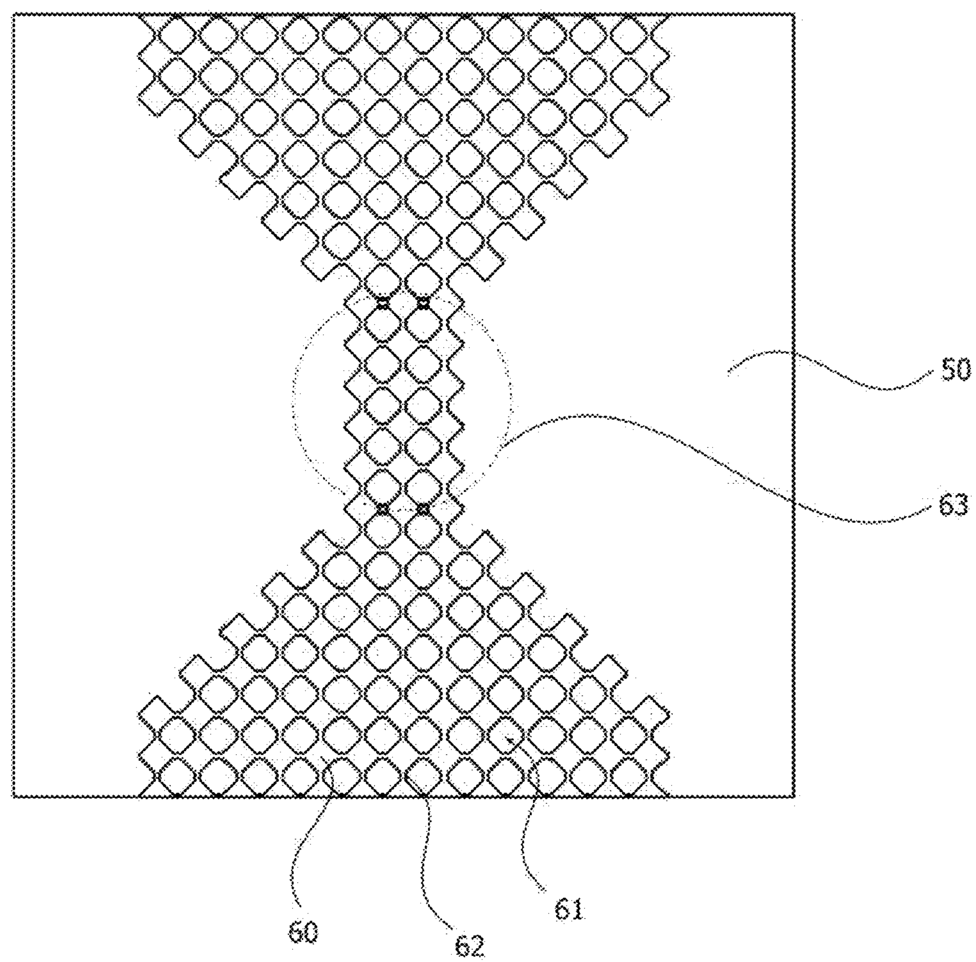
FIGS. 2A-2D are schematic plan diagrams showing a second electrode layer according to the exemplary embodiment of the present disclosure.
Figure 2B:
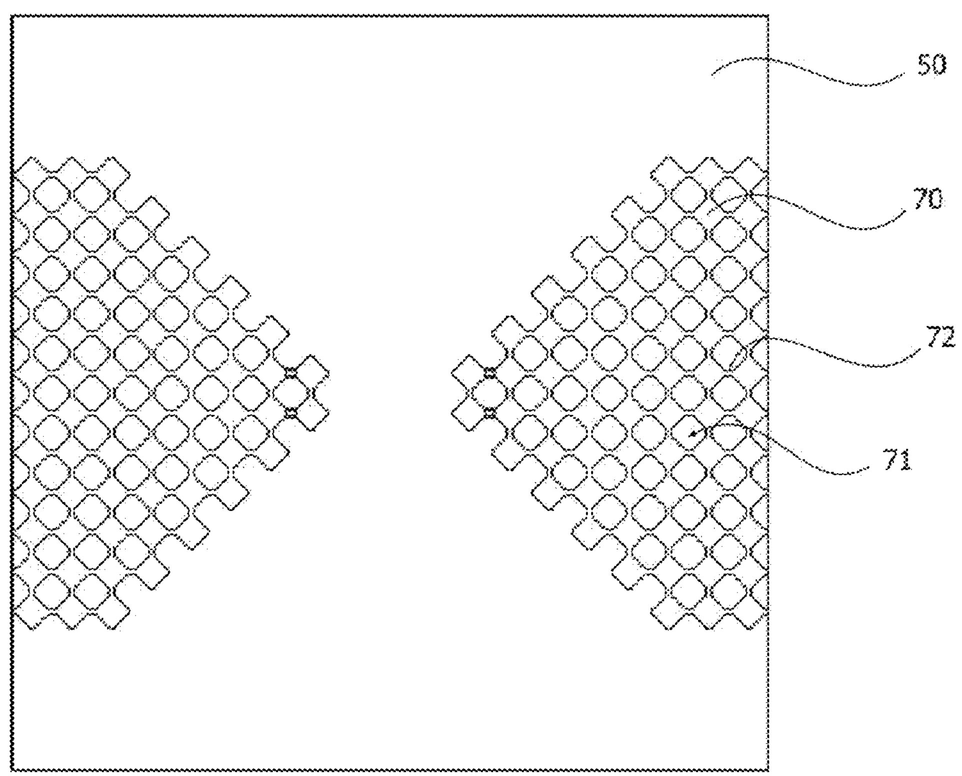
Figure 2C:
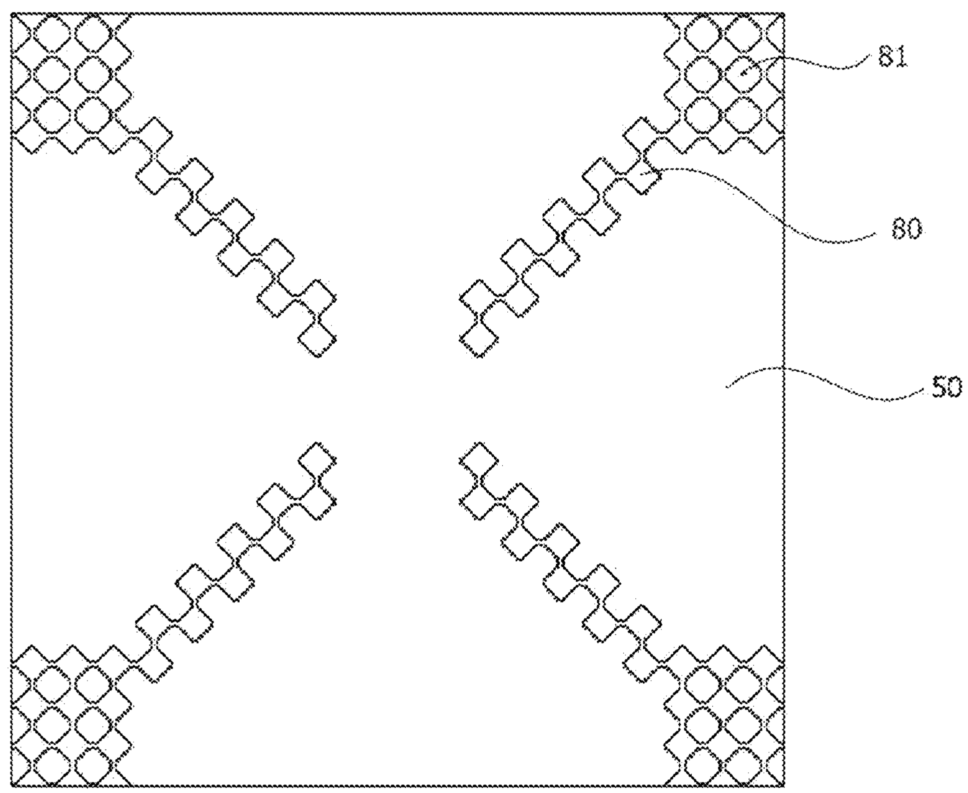
Figure 2D:
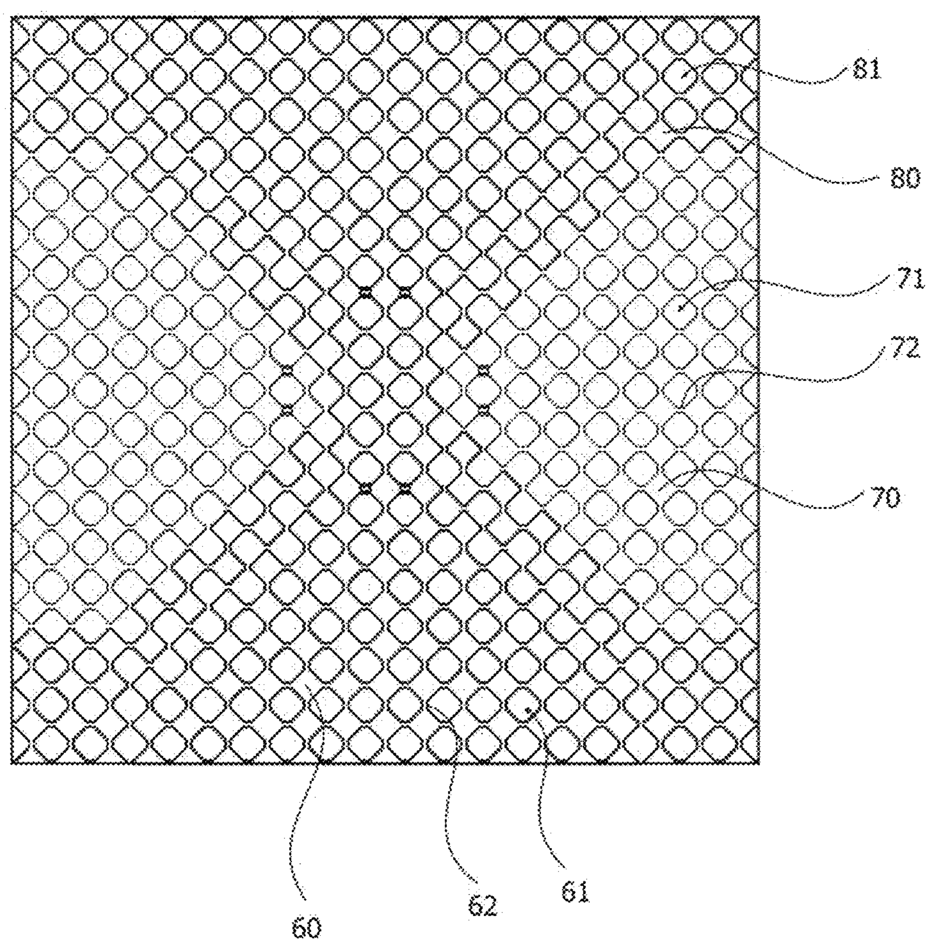
Figure 3:
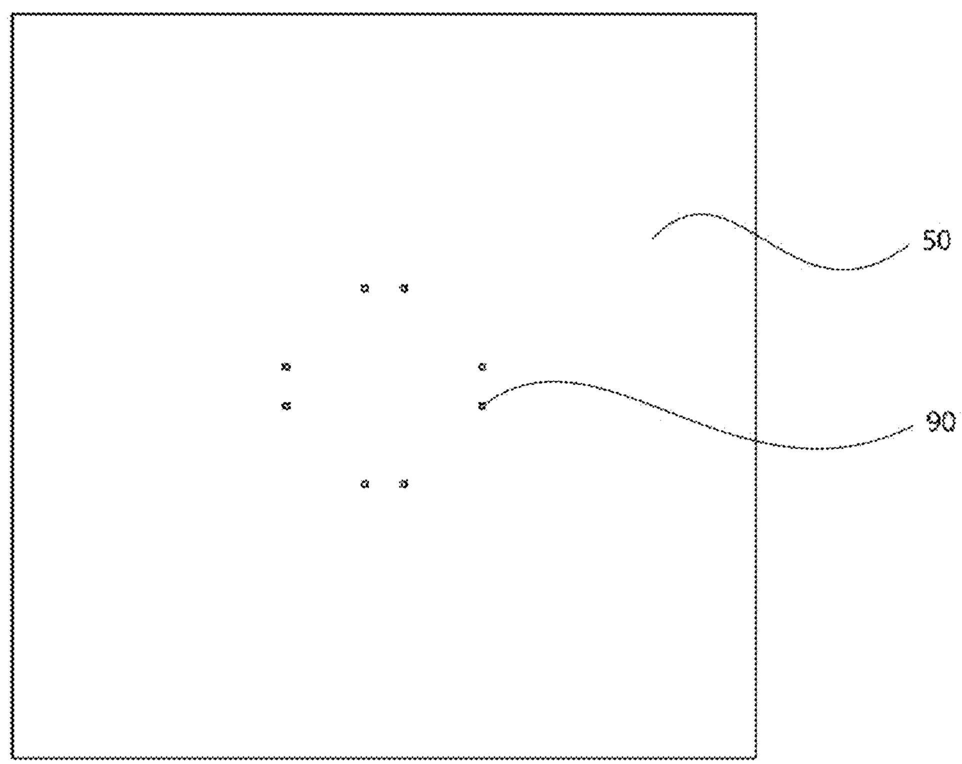
FIG. 3 is a schematic plan diagram showing an insulating layer having a contact hole formed therein according to the exemplary embodiment of the present disclosure.
Figure 4:
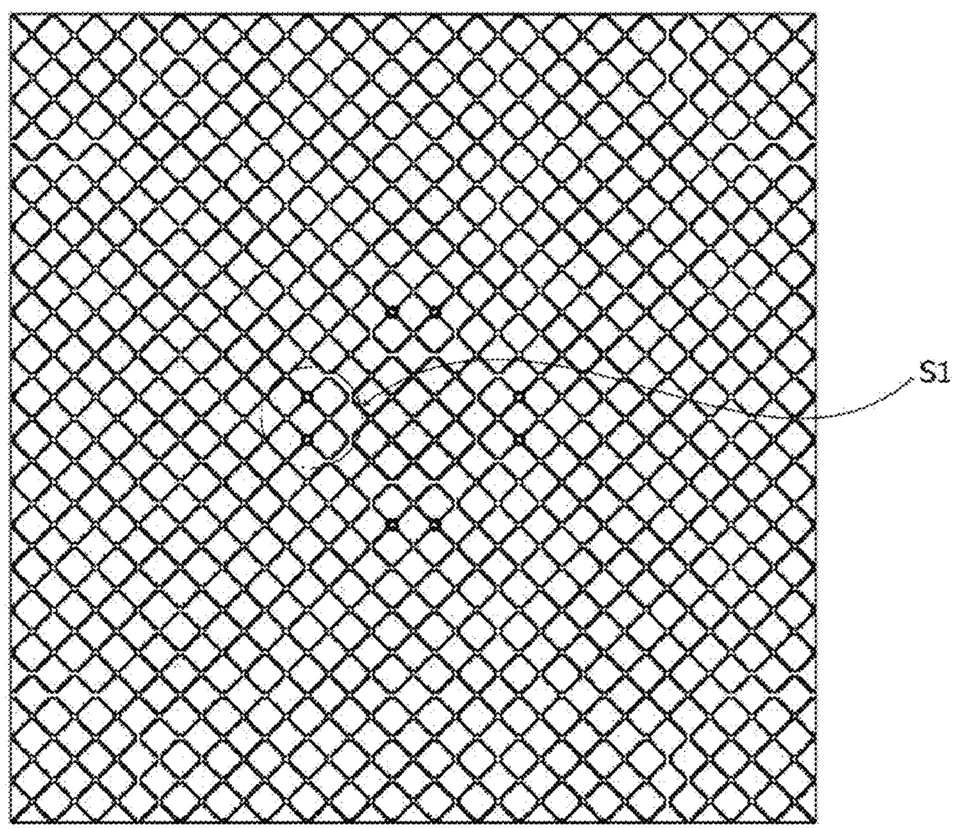
FIG. 4 is a schematic plan diagram showing a touch sensor according to the exemplary embodiment of the present disclosure.
Figure 5:
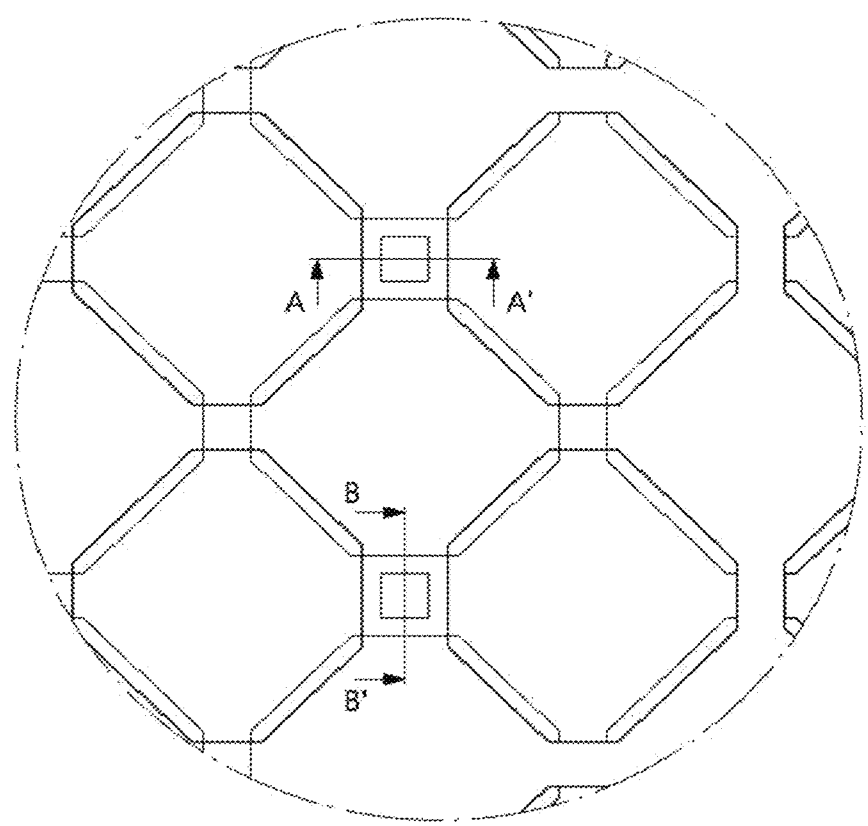
FIG. 5 is an enlarged diagram of a region (S1) of FIG. 4.

FIG. 1 is schematic plan diagrams showing a first electrode layer according to an exemplary embodiment of the present disclosure, FIG. 2 is schematic plan diagrams showing a second electrode layer according to the exemplary embodiment of the present disclosure, FIG. 3 is a schematic plan diagram showing an insulating layer having a contact hole formed therein according to the exemplary embodiment of the present disclosure, FIG. 4 is a schematic plan diagram showing a touch sensor according to the exemplary embodiment of the present disclosure, and FIG. 5 is an enlarged diagram of a region (S1) of FIG. 4.

Figure 6:
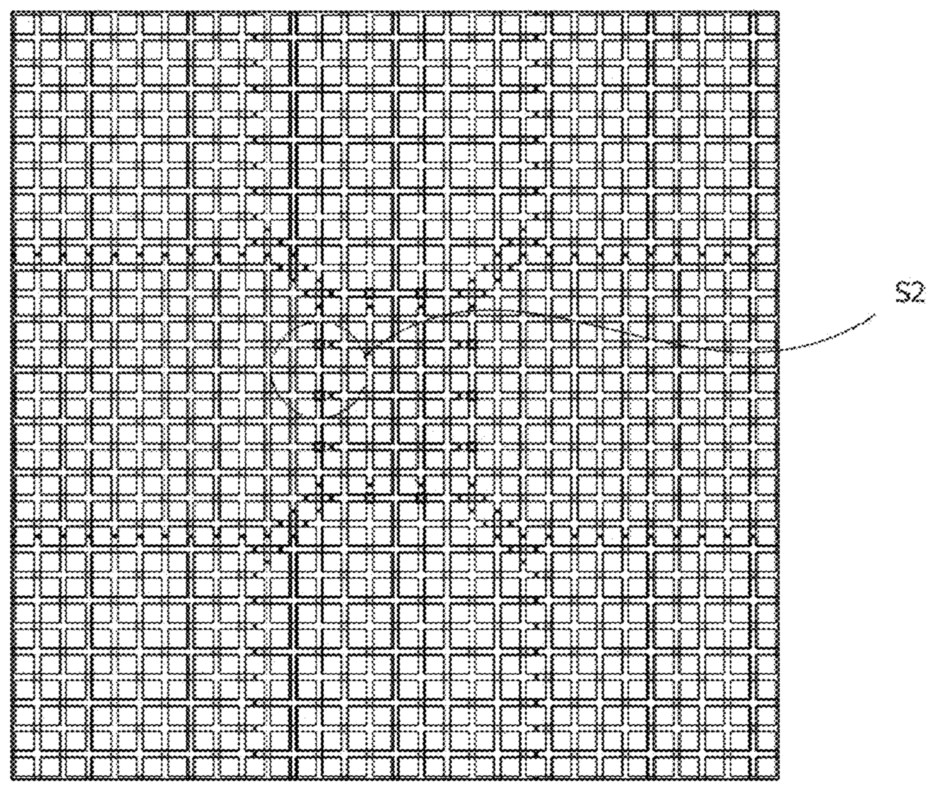
FIG. 6 is a schematic plan diagram showing a touch sensor according to another exemplary embodiment of the present disclosure.
Figure 7:
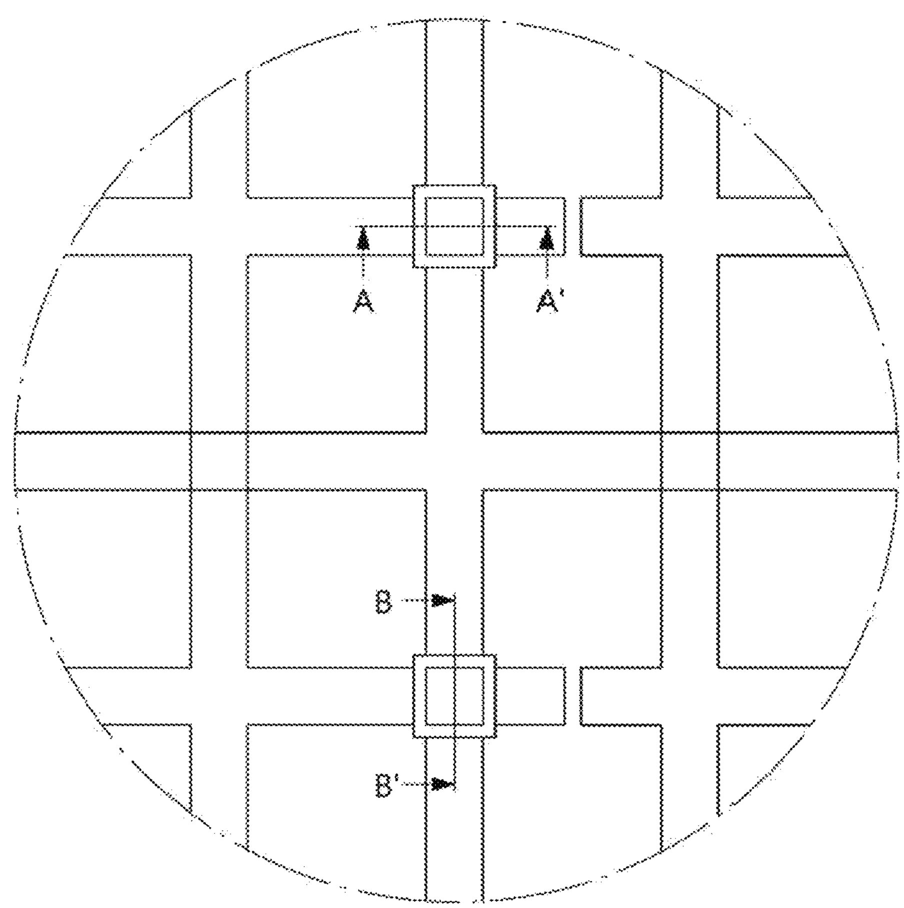
FIG. 7 is an enlarged diagram showing a region (S2) of FIG. 6.
Figure 8A:
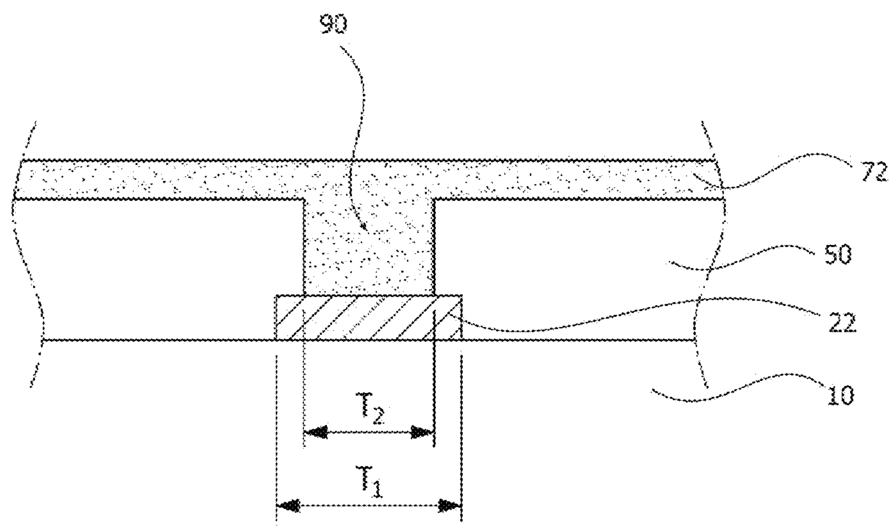
FIGS. 8A-8B are schematic cross-sectional diagrams of cutout surfaces taken along lines A-A' and B-B' of FIGS. 5 and 7.
Figure 8B:
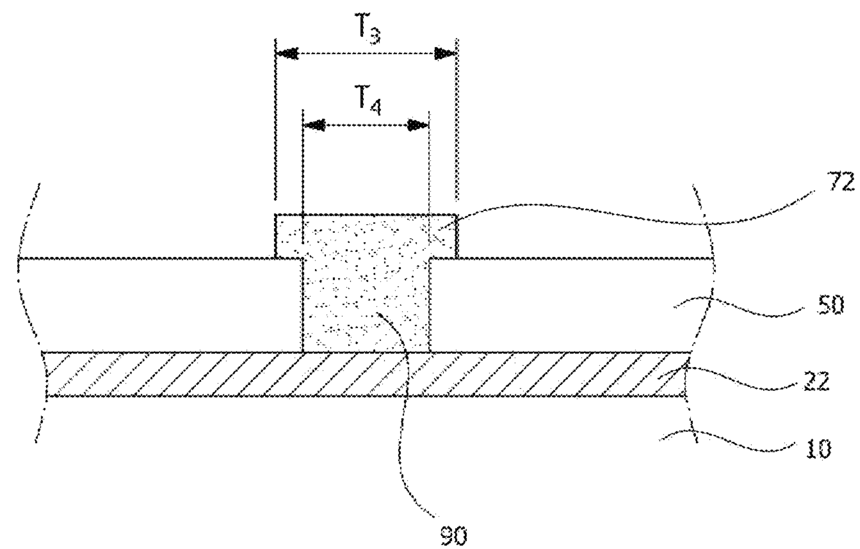

FIG. 6 is a schematic plan diagram showing a touch sensor according to another exemplary embodiment of the present disclosure, and FIG. 7 is an enlarged diagram showing a region (S2) of FIG. 6. FIG. 8 is a schematic cross-sectional diagram of cutout surfaces taken along lines A-A' and B-B' of FIGS. 5 and 7.

Referring to FIGS. 1 to 8, a touch sensor according to the present disclosure may include: a first electrode layer and a second electrode layer provided on a base layer 10. The first electrode layer and the second electrode layer may be spaced apart from each other in a thickness direction with an interlayer insulating layer 50 interposed therebetween. The first electrode layer and the second electrode layer may be electrically connected by a contact hole 90 formed in a part of the insulating layer 50.

The base layer 10 is not especially limited as long as it serves as a base capable of structurally supporting the electrode layer, the insulating layer 50, etc., and may include a film-type base, etc. According to one or a plurality of exemplary embodiments, the base layer 10 may include: glass; polymer materials such as cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclic olefin copolymer (COC), polymethyl methacrylate (PMMA); and/or inorganic insulating materials such as silicon oxide, silicon nitride, silicon oxynitride, and metal oxide.

The layer or film member of an image display device may be provided as the base layer 10 of the touch sensor. According to one or a plurality of exemplary embodiments, an encapsulation layer or a passivation layer included in a display panel may be provided as the base layer 10.

The first electrode layer includes: a first main electrode and a first auxiliary electrode. According to the exemplary embodiment, the first electrode layer may be formed to include a first main electrode unit pattern 20 constituting the first main electrode, a first main electrode connection part 22 for connecting the first main electrode unit pattern 20, a first auxiliary electrode unit pattern 30 constituting the first auxiliary electrode, and a first auxiliary electrode connection part 32 for connecting the first auxiliary electrode unit pattern 30. According to another exemplary embodiment, the first main electrode and the first auxiliary electrode may be formed to include a mesh-shaped pattern. The first electrode layer may be formed on an upper surface of the base layer 10. A configuration and structure of the first electrode layer will be described later in more detail with reference to the drawings to be described later.

The insulating layer 50 may be formed on the base layer 10 to cover the first electrode layer. The insulating layer 50 is not especially limited as long as it serves to electrically insulate the first electrode layer and the second electrode layer. According to one or a plurality of exemplary embodiments, the insulating layer 50 may include: an organic insulating material such as an epoxy-based resin, an acrylic-based resin, a siloxane-based resin or a polyimide-based resin, and/or an inorganic insulating material such as silicon oxide or silicon nitride.

The second electrode layer includes: a second main electrode and a second auxiliary electrode. According to the exemplary embodiment, the second electrode layer may be formed to include a second main electrode unit pattern 60 constituting the second main electrode, a second main electrode connection part 62 for connecting the second main electrode unit pattern 60, a second auxiliary electrode unit pattern 70 constituting the second auxiliary electrode, and a second auxiliary electrode connection part 72 for connecting the second auxiliary electrode unit patter 70. According to another exemplary embodiment, the second main electrode and the second auxiliary electrode may be formed to include a mesh-shaped pattern. The second electrode layer may be formed on the upper surface of the insulating layer 50. A configuration and structure of the second electrode layer will be described later in more detail with reference to the drawings to be described later.

The contact hole 90 may be formed in a part of the insulating layer 50 to electrically connect the first electrode layer with the second electrode layer, and specifically, may be to electrically connect at least one of the first main electrode and the second auxiliary electrode opposite thereto; and the second main electrode and the first auxiliary electrode opposite thereto. A configuration and structure of the contact hole will be described later in more detail with reference to the drawings to be described later.

According to the exemplary embodiment, the first electrode layer and the second electrode layer may be formed to include a transparent conductive oxide. For example, the transparent conductive oxide may include: one or more selected from a group consisting of indium tin oxide (ITO), indium zinc oxide (IZO), zinc oxide (ZnO), indium zinc tin oxide (IZTO), and cadmium tin oxide (CTO).

According to some exemplary embodiments, the first electrode layer and the second electrode layer may be formed to include a metal. For example, the metal may include: one or more selected from a group consisting of silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), and alloys thereof (e.g., silver-palladium-copper (APC)).

According to some exemplary embodiments, the first electrode layer and the second electrode layer may include: a stacked structure of a transparent conductive oxide layer and a metal layer. For example, each of the first electrode layer and the second electrode layer may also have a three-layer structure of transparent conductive oxide layer-metal layer-transparent conductive oxide layer. In this case, it is possible to improve the flexible characteristic by the metal layer, to improve a signal delivery speed by reducing the resistance, and to improve corrosion resistance and transparency by the transparent conductive oxide layer.

According to some exemplary embodiments, each of the first electrode layer and the second electrode layer may be formed to include a mesh-shaped metal electrode pattern. There is an advantage in that if the first electrode layer and the second electrode layer are formed to include the mesh-shaped metal electrode pattern, it is possible to reduce the resistance between the electrodes or between the electrode and the wiring, thereby improving the conductivity and detection strength of the touch sensor, and further improving the flexible characteristics.

A passivation layer covering the second electrode layer may be formed on the insulating layer 50. The passivation layer is not especially limited as long as it may protect the electrode layer and the insulating film from the outside, and according to one or a plurality of exemplary embodiments, the passivation layer may include: an organic insulating material such as an epoxy-based resin, an acrylic-based resin, a siloxane-based resin, or a polyimide-based resin, or an inorganic insulating material such as silicon oxide or silicon nitride.

Figure 1B:
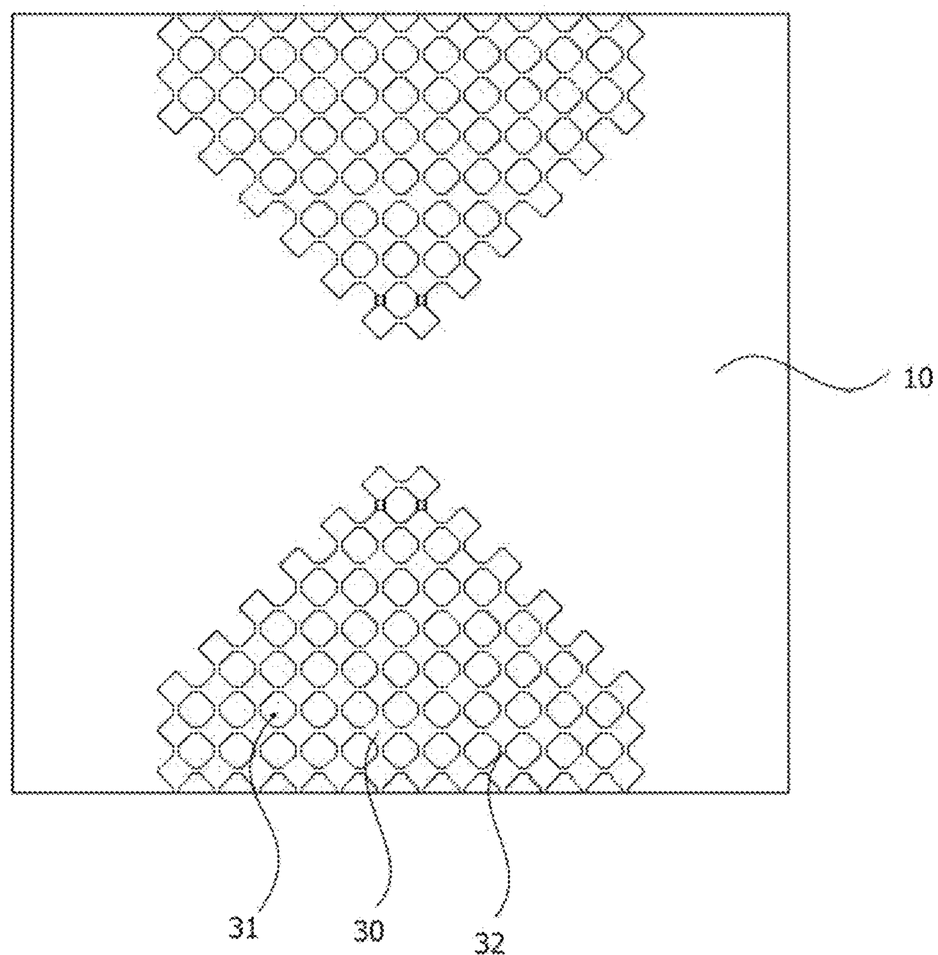
Figure 1C:
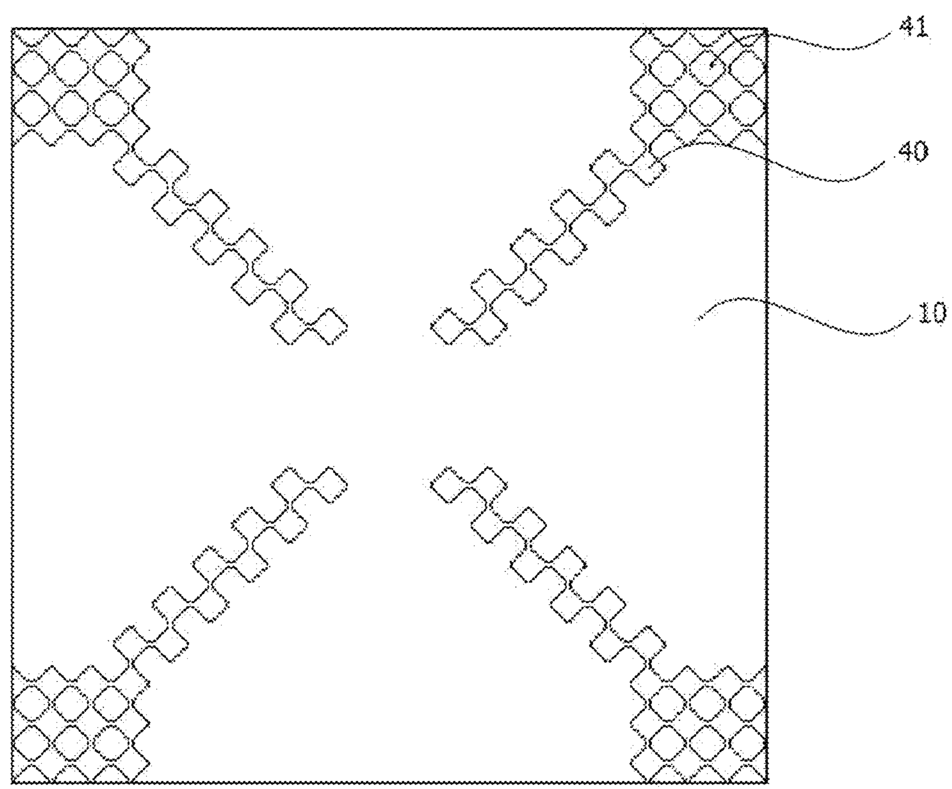
Figure 1D:
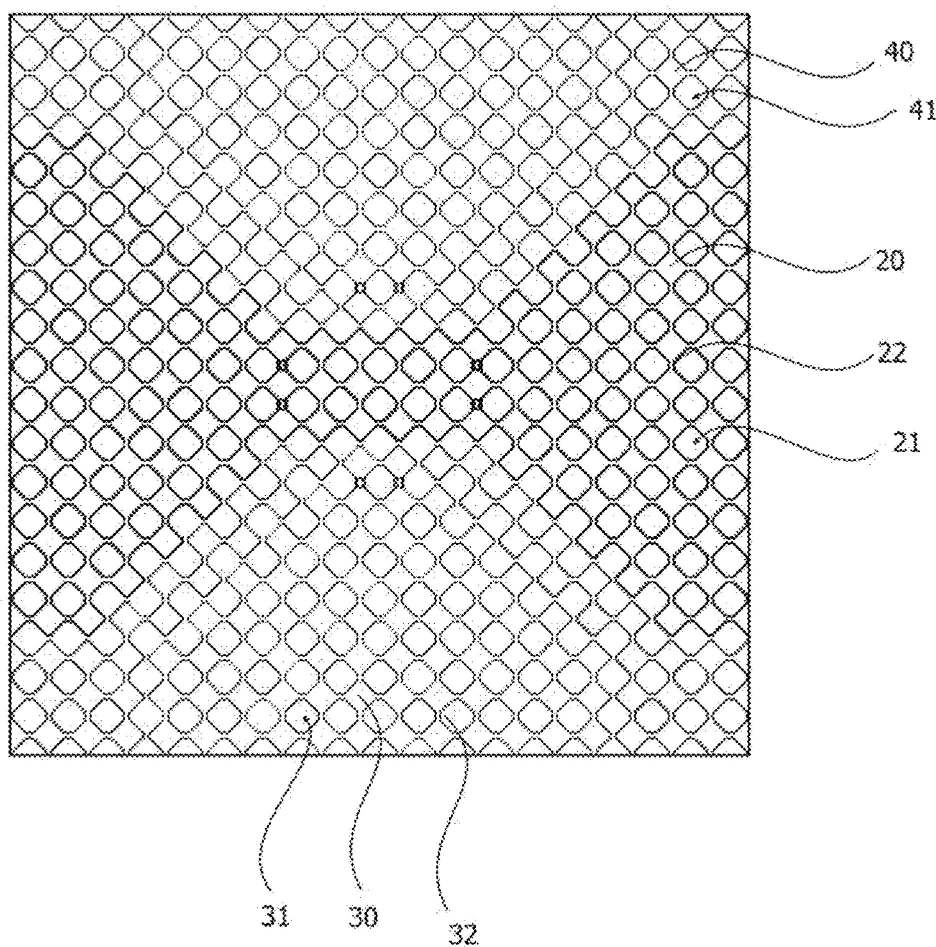

FIG. 1A is a plan diagram separately showing the first main electrode according to the exemplary embodiment of the present disclosure, FIG. 1B is a plan diagram separately showing the first auxiliary electrode according to the exemplary embodiment of the present disclosure, FIG. 1C is a plan diagram separately showing a first dummy electrode according to the exemplary embodiment of the present invention, and FIG. 1D is a plan diagram showing FIGS. 1A to 1C together.

Referring to FIG. 1A, the first main electrode may be formed on the base layer 10.

According to the exemplary embodiment, the first main electrode may have a polygonal pattern shape such as a rhombus and include a plurality of first main electrode unit patterns 20 regularly repeated. According to some exemplary embodiments, the first main electrode unit pattern 20 may have a shape substantially the same as or similar to that of a second sphere 71 (see FIG. 2B).

According to the exemplary embodiment, the plurality of first main electrode unit patterns 20 may be arranged in a row direction, and the adjacent first main electrode unit patterns 20 in the row direction may be physically and electrically connected to the first main electrode unit pattern 20 provided in a first connection part 23.

According to the exemplary embodiment, the plurality of first main electrode unit patterns 20 may be integrally connected by the first connection parts 23 to form the first main electrode unit pattern row extending in the row direction. The plurality of first main electrode unit pattern rows may be arranged in a column direction.

The first main electrode unit pattern 20 may be physically and electrically connected to the adjacent first main electrode unit pattern 20 by the first main electrode connection part 22, and the first main electrode connection part 22 may be formed integrally with the first main electrode unit pattern 20.

The first main electrode may be formed to include a first hole 21. The first hole 21 may be defined as a through hole formed by the arrangement of the plurality of adjacent first main electrode unit patterns 20, and the upper surface of the base layer 10 may be exposed through the first hole 21.

According to the exemplary embodiment, the first hole 21 may have a polygonal shape such as a substantially rhombic shape and may be regularly repeated. The first hole 21 may also be formed in the first connection part 23.

Referring to FIG. 1B, the first auxiliary electrode may be formed on the base layer 10.

According to the exemplary embodiment, the first auxiliary electrode may be formed on a portion of the upper surface of the base layer 10 in which the first main electrode is not formed when viewed in a planar direction. The first auxiliary electrode may be formed around the first main electrode and formed to be spaced apart from the first main electrode.

According to the exemplary embodiment, the first auxiliary electrode may have a polygonal pattern shape such as a rhombus and include a plurality of first auxiliary electrode unit patterns 30 regularly repeated. According to the exemplary embodiment, the first auxiliary electrode unit pattern 30 may have a shape substantially the same as or similar to that of a second hole 61 (see FIG. 2A).

The first auxiliary electrode unit pattern 30 may be physically and electrically connected to the adjacent first auxiliary electrode unit pattern 30 by a first auxiliary electrode connection part 32, and the first auxiliary electrode connection part 32 may be formed integrally with the first auxiliary electrode unit pattern 30.

The first auxiliary electrode may be formed to include the first sphere 31. The first sphere 31 may be defined as a through hole formed by the arrangement of the plurality of adjacent first auxiliary electrode unit patterns 30, and the upper surface of the base layer 10 may be exposed through the first sphere 31.

According to the exemplary embodiment, the first sphere 31 may have a polygonal shape such as a substantially rhombus shape and may be regularly repeated.

Referring to FIG. 1C, the first dummy electrode may be formed on the base layer 10.

According to the exemplary embodiment, the first dummy electrode may be formed on a portion of the upper surface of the base layer 10 in which the first main electrode and the first auxiliary electrode are not formed when viewed from the planar direction. The first dummy electrode may be formed around the first main electrode and the first auxiliary electrode, and formed to be spaced apart from the first main electrode and the first auxiliary electrode.

According to the exemplary embodiment, the first dummy electrode may have a polygonal pattern shape such as a rhombus shape and include a plurality of first dummy electrode unit patterns 40 regularly repeated. According to the exemplary embodiment, the first dummy electrode unit pattern 40 may have a shape substantially the same as or similar to that of a second space 81 (see FIG. 2C).

The first dummy electrode unit pattern 40 may have a separate floating pattern or island pattern shape, but is not limited thereto, and may be integrally formed by connecting each pattern.

The first dummy electrode may be formed to include a first space 41. The first space 41 may be defined as a through hole formed by the arrangement of the plurality of adjacent first dummy electrode unit patterns 40, and the upper surface of the base layer 10 may be exposed through the first space 41. According to the exemplary embodiment, the first space 41 may be a through hole formed by three adjacent first dummy electrode unit patterns 40 and adjacent first main electrode unit patterns 20 or adjacent first auxiliary electrode unit patterns 30.

According to the exemplary embodiment, the first space 41 may have a substantially rhombus shape with one or more open vertices, and be regularly repeated, but is not limited thereto, and may have a polygonal shape such as a substantially rhombus shape by the first dummy electrode unit pattern formed integrally and may be regularly repeated.

Referring to FIG. 1D, as described above, the first electrode layer may be formed to include the first main electrode, the first auxiliary electrode, and the first dummy electrode arranged on the upper surface of the base layer 10.

As shown in FIG. 1D, the first auxiliary electrode may be arranged to be spaced apart from the first main electrode by a constant spacing, and the first dummy electrode may be arranged adjacent to the first main electrode and the first auxiliary electrode in the spacing.

Therefore, electrode patterns, holes, spheres, and spaces may be arranged on the upper surface of the base layer 10 in a regularly repeated structure as a whole, and uniformized in an array structure having the form of the spatial frequency including high-frequency components as a whole due to the repeated structure.

FIG. 2A is a plan diagram separately showing the second main electrode according to the exemplary embodiment of the present disclosure, FIG. 2B is a plan diagram separately showing the second auxiliary electrode according to the exemplary embodiment of the present disclosure, FIG. 2C is a plan diagram separately showing the second dummy electrode according to the exemplary embodiment of the present disclosure, and FIG. 2D is a plan diagram showing FIGS. 2A to 2C together.

Referring to FIG. 2A, the second main electrode may be formed on the insulating layer 50.

According to the exemplary embodiment, the second main electrode may have a polygonal pattern shape such as a rhombus shape and include the plurality of second main electrode unit patterns 60 regularly repeated. According to some exemplary embodiments, the second main electrode unit pattern 60 may have a shape substantially the same as or similar to that of the first sphere 31 (see FIG. 1B).

According to the exemplary embodiment, the plurality of second main electrode unit patterns 60 may be arranged in the column direction, and the adjacent second main electrode unit patterns 60 in the column direction may be physically and electrically connected to the second main electrode unit pattern 60 provided in the second connection part 63.

According to the exemplary embodiment, the plurality of second main electrode unit patterns 60 may be integrally connected by the second connection part 63 to form the second main electrode unit pattern column extending in the column direction. The plurality of second main electrode unit pattern columns may be arranged in the row direction.

The second main electrode unit pattern 60 may be physically and electrically connected to the adjacent second main electrode unit pattern 60 by the second main electrode connection part 62, and the second main electrode connection part 62 may be integrally formed with the second main electrode unit pattern 60.

The second main electrode may be formed to include the second hole 61. The second hole 61 may be defined as a through hole formed by the arrangement of the plurality of adjacent second main electrode unit patterns 60, and the upper surface of the insulating layer 50 may be exposed through the second hole 61.

According to the exemplary embodiment, the second hole 61 may have a polygonal shape such as a substantially rhombic shape and may be regularly repeated. The second hole 61 may also be formed in the second connection part 63.

Referring to FIG. 2B, the second auxiliary electrode may be formed on the insulating layer 50.

According to the exemplary embodiment, the second auxiliary electrode may be formed on a portion of the upper surface of the insulating layer 50 in which the second main electrode is not formed when viewed from the planar direction. The second auxiliary electrode may be formed around the second main electrode and formed to be spaced apart from the second main electrode.

According to the exemplary embodiment, the second auxiliary electrode may have a polygonal pattern shape such as a rhombus shape and include the plurality of second auxiliary electrode unit patterns 70 regularly repeated. According to the exemplary embodiment, the second auxiliary electrode unit pattern 70 may have a shape substantially the same as or similar to that of the first hole 21 (see FIG. 1A).

The second auxiliary electrode unit pattern 70 may be physically and electrically connected to the adjacent second auxiliary electrode unit pattern 70 by the second auxiliary electrode connection part 72, and the second auxiliary electrode connection part 72 may be formed integrally with the second auxiliary electrode unit pattern 70.

The second auxiliary electrode may be formed to include the second sphere 71. The second sphere 71 may be defined as a through hole formed by the arrangement of the plurality of adjacent second auxiliary electrode unit patterns 70, and the upper surface of the insulating layer 50 may be exposed through the second sphere 71.

According to the exemplary embodiment, the second sphere 71 may have a polygonal shape such as a substantially rhombus shape and may be regularly repeated.

Referring to FIG. 2C, the second dummy electrode may be formed on the insulating layer 50.

According to the exemplary embodiment, the second dummy electrode may be formed on a portion of the upper surface of the insulating layer 50 in which the second main electrode and the second auxiliary electrode are not formed when viewed from the planar direction. The second dummy electrode may be formed around the second main electrode and the second auxiliary electrode, and formed to be spaced apart from the second main electrode and the second auxiliary electrode.

According to the exemplary embodiment, the second dummy electrode may have a polygonal pattern shape such as a rhombus shape and include the plurality of second dummy electrode unit patterns 80 regularly repeated. According to the exemplary embodiment, the second dummy electrode unit pattern 80 may have a shape substantially the same as or similar to that of the first space 41 (see FIG. 1C).

The second dummy electrode unit pattern 80 may have a separate floating pattern or island pattern shape, but is not limited thereto, and may be integrally formed by connecting each pattern.

The second dummy electrode may be formed to include the second space 81. The second space 81 may be defined as a through hole formed by the arrangement of the plurality of adjacent second dummy electrode unit patterns 80, and the upper surface of the insulating layer 50 may be exposed through the second space 81. According to the exemplary embodiment, the second space 81 may be a through hole formed by three adjacent second dummy electrode unit patterns 80 and the adjacent second main electrode unit patterns 60 or the adjacent second auxiliary electrode unit patterns 70.

According to the exemplary embodiment, the second space 81 may have a substantially rhombus shape with one or more open vertices and may be regularly repeated, but is not limited thereto, and may have a polygonal shape such as a substantially rhombus shape by the second dummy electrode unit pattern integrally formed and be regularly repeated.

Referring to FIG. 2D, as described above, the second electrode layer may be formed to include the second main electrode, the second auxiliary electrode, and the second dummy electrode arranged on the upper surface of the insulating layer 50.

As shown in FIG. 2D, the second auxiliary electrode may be arranged to be spaced apart from the second main electrode by a constant spacing, and the second dummy electrode may be arranged adjacent to the second main electrode and the second auxiliary electrode in the spacing.

Therefore, electrode patterns, holes, spheres, and spaces may be arranged on the upper surface of the insulating layer 50 in a regularly repeated structure as a whole, and uniformized in an array structure having the form of the spatial frequency including high-frequency components as a whole due to the repeated structure.

Referring to FIG. 3, the contact hole 90 may have two pairs of contact holes 90 for electrically connecting the first main electrode with the second auxiliary electrode, and two pairs of contact holes 90 for electrically connecting the second main electrode with the first auxiliary electrode formed at positions closest to the first connection part 23 and the second connection part 63.

According to some exemplary embodiments, the contact hole 90 may have a pair of contact holes 90 for electrically connecting the first main electrode with the second auxiliary electrode and a pair of contact holes 90 for electrically connecting the second main electrode with the first auxiliary electrode formed at positions closest to the first connection part 23 and the second connection part 63; and according to other exemplary embodiments, the contact hole 90 may be formed to be spaced apart from the first connection part 23 and the second connection part 63 by a constant spacing distance.

In addition to those shown in FIG. 3, the contact hole 90 may be formed on the insulating layer 50 in various shapes, and is not especially limited as long as it may electrically connect the first main electrode with the second auxiliary electrode and the second main electrode with the first auxiliary electrode, thereby minimizing the parasitic capacitance and the channel resistance, and at least one contact hole 90 is preferably formed.

In terms of process economic feasibility and the conductivity and detection strength of the touch sensor, the contact hole 90 is preferably formed on a point where the first main electrode connection part 22 formed on the first main electrode and the second auxiliary electrode connection part 72 formed on the second auxiliary electrode intersect each other in the planar direction; and/or a point where the second main electrode connection part 62 formed on the second main electrode and the first auxiliary electrode connection part 32 formed on the first auxiliary electrode intersect each other in the planar direction (see FIG. 4).

According to the exemplary embodiment, the contact hole 90 may have a square shape indicating the size of 30 μm×30 μm, but is not especially limited thereto, and is not especially limited as long as it may electrically connect the first electrode layer with the second electrode layer.

The contact hole 90 serves to electrically connect the first electrode layer with the second electrode layer, and specifically, to electrically connect the first main electrode with the second auxiliary electrode, and the second main electrode with the first auxiliary electrode so that the first main electrode and the second auxiliary electrode, and the second main electrode and the first auxiliary electrode form the equipotential, respectively, thereby improving the resistance of the electrode channel as well as suppressing the generation of the parasitic capacitance.

Specifically, FIG. 4 is a plan diagram in which the first electrode layer shown in FIG. 1D, the second electrode layer shown in FIG. 2D, and the insulating layer 50 shown in FIG. 3 are projected together in the planar direction.

Referring to FIG. 4, the second auxiliary electrode unit pattern 70 may overlap the first hole 21 formed in the first main electrode in the planar direction. According to the exemplary embodiment, the second auxiliary electrode unit pattern 70 may be completely included in the first hole 21 in the planar direction.

The second main electrode unit pattern 60 may overlap the first sphere 31 formed in the first auxiliary electrode in the planar direction. According to the exemplary embodiment, the second main electrode unit pattern 60 may be completely included in the first sphere 31 in the planar direction.

The first auxiliary electrode unit pattern 30 may overlap the second hole 61 formed in the second main electrode in the planar direction. According to the exemplary embodiment, the first auxiliary electrode unit pattern 30 may be completely included in the second hole 61 in the planar direction.

The first main electrode unit pattern 20 may overlap the second sphere 71 formed in the second auxiliary electrode in the planar direction. According to the exemplary embodiment, the first main electrode unit pattern 20 may be completely included in the second sphere 71 in the planar direction.

In addition, the first main electrode unit pattern 20 formed in the first connection part 23 may overlap the second hole 61 formed in the second connection part 63 in the planar direction. According to the exemplary embodiment, the first main electrode unit pattern 20 may be completely included in the second hole 61 in the planar direction.

The second main electrode unit pattern 60 formed in the second connection part 63 may overlap the first hole 21 formed inside the first connection part 23 in the planar direction. According to the exemplary embodiment, the second main electrode unit pattern 60 may be completely included in the first hole 21 in the planar direction.

The first dummy electrode unit pattern 40 may overlap the second space 81 formed in the second dummy electrode in the planar direction. According to the exemplary embodiment, the first dummy electrode unit pattern 40 may be completely included in the second space 81 in the planar direction.

The second dummy electrode unit pattern 80 may overlap the first space 41 formed in the first dummy electrode in the planar direction. According to the exemplary embodiment, the second dummy electrode unit pattern 80 may be completely included in the first space 41 in the planar direction.

The contact hole 90 may have two pairs of contact holes 90 for electrically connecting the first main electrode with the second auxiliary electrode, and two pairs of contact holes 90 for electrically connecting the second main electrode with the first auxiliary electrode formed.

Specifically, two pairs of contact holes 90 formed at the positions closest to the first connection part 23 and the second connection part 63 among the points where the first main electrode connection part 22 for connecting the plurality of adjacent first main electrode unit patterns 20 in the column direction and the second auxiliary electrode connection part 72 for connecting the plurality of adjacent second auxiliary electrode unit patterns 70 in the row direction intersect in the planar direction, and two pair of contact holes 90 formed at the positions closest to the first connection part 23 and the second connection part 63 among the points where the second main electrode connection part 62 for connecting the plurality of adjacent second main electrode unit patterns 60 in the row direction and the first auxiliary electrode connection part 32 for connecting the plurality of adjacent first auxiliary electrode unit patterns 30 in the column direction intersect each other in the planar direction may be formed.

According to one or a plurality of exemplary embodiments, the contact hole may be provided at the points where the connection part for connecting the plurality of adjacent first main electrode unit patterns in the row direction and the connection part for connecting the plurality of adjacent second auxiliary electrode unit patterns in the column direction intersect each other in the planar direction; and/or the points where the connection part for connecting the plurality of adjacent second main electrode unit patterns in the column direction and the connection part for connecting the plurality of adjacent first auxiliary electrode unit patterns in the row direction intersect each other in the planar direction, does not necessarily have to be formed with regularity, and is not especially limited as long as it may electrically connect the first main electrode with the second auxiliary electrode and the second main electrode with the first auxiliary electrode, thereby minimizing the parasite capacitance and the channel resistance.

Referring to FIG. 6, the touch sensor according to another exemplary embodiment of the present disclosure may include the first electrode layer and the second electrode layer including the mesh-shaped electrode pattern.

Each element included in the touch sensor according to another exemplary embodiment of the present disclosure satisfies all of the aforementioned characteristics, and may represent substantially the same characteristics.

Figure 9:
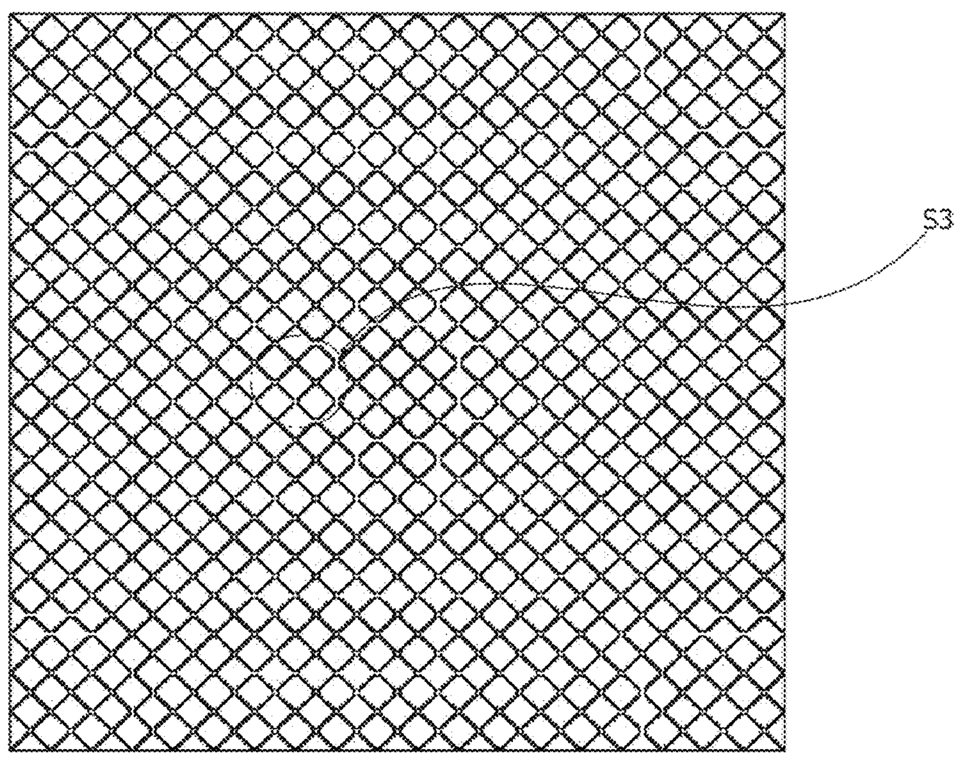
FIG. 9 is a schematic plan diagram showing a touch sensor according to a Comparative Example of the present disclosure.
Figure 10:
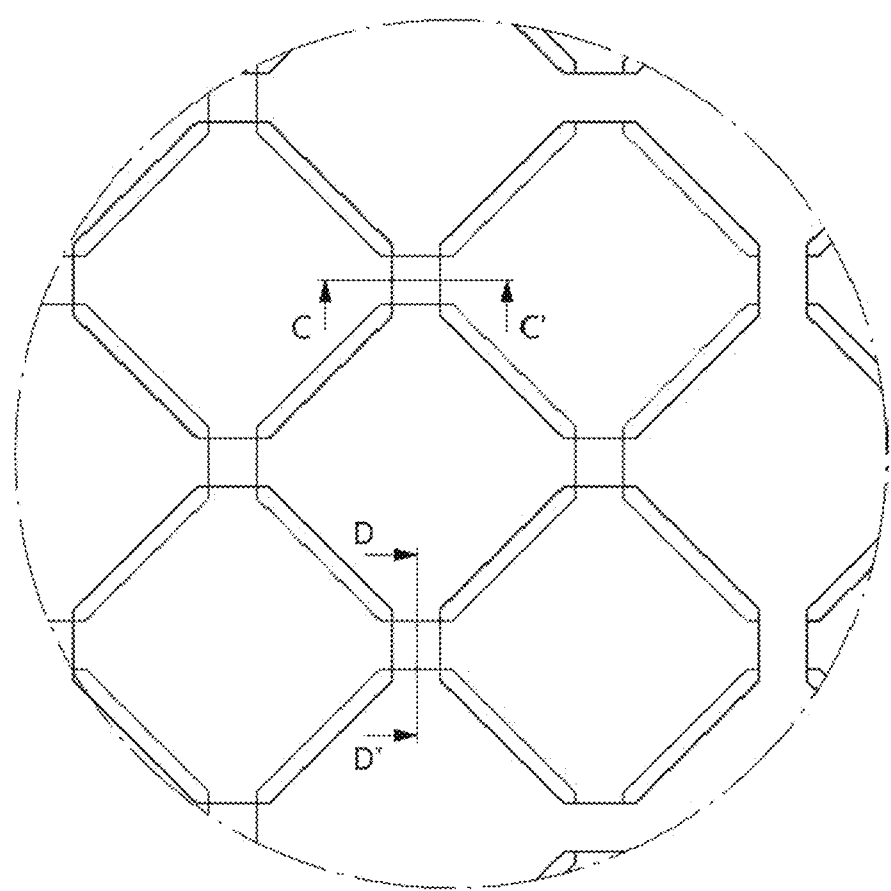
FIG. 10 is an enlarged diagram showing a region (S3) of FIG. 9.
Figure 11:
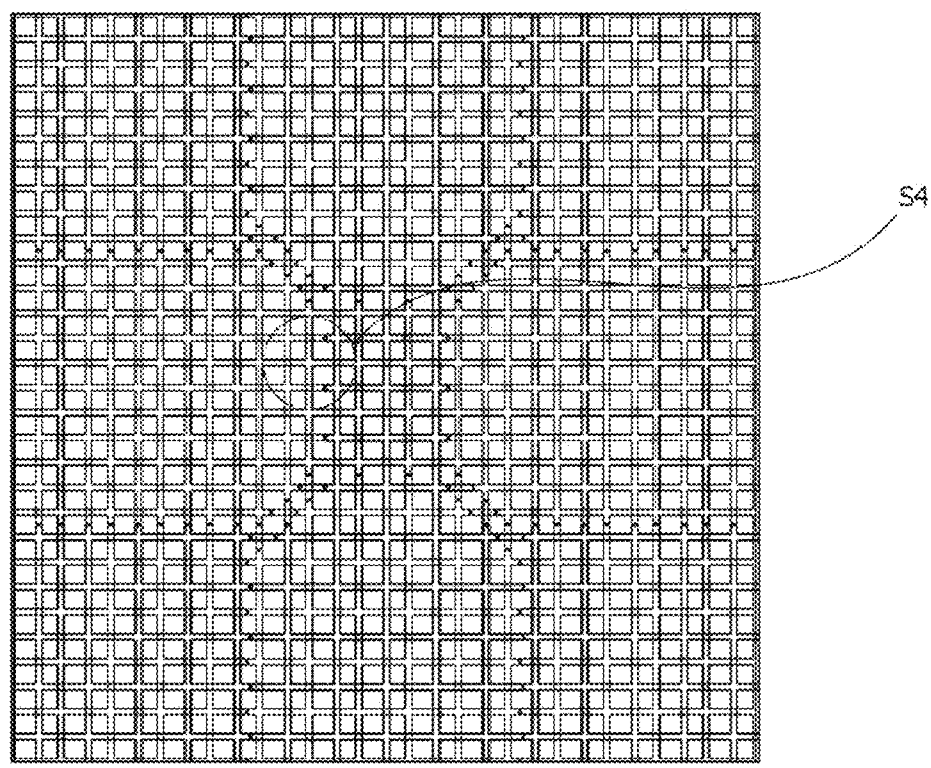
FIG. 11 a schematic plan diagram showing a touch sensor according to another Comparative Example of the present disclosure.
Figure 12:
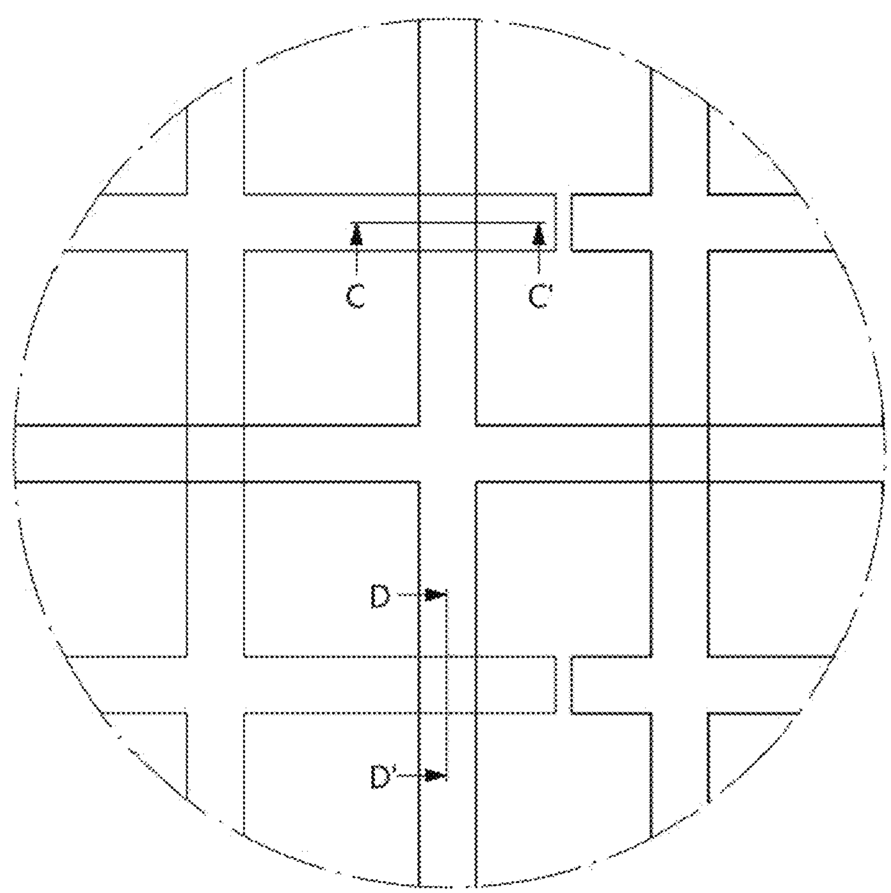
FIG. 12 is an enlarged diagram of a region (S4) of FIG. 11.
Figure 13A:
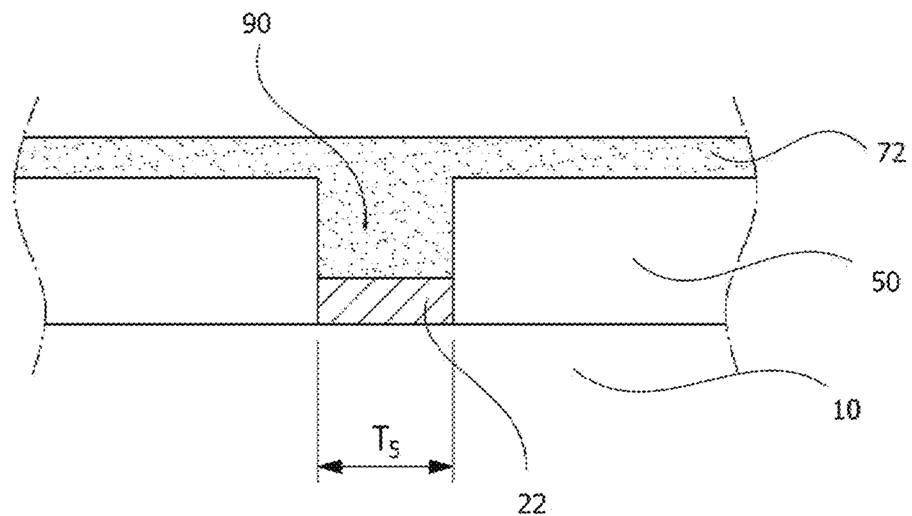
FIGS. 13A-13B are schematic cross-sectional diagrams of cutout surfaces taken along lines C-C' and D-D' of FIGS. 10 and 12.
Figure 13B:
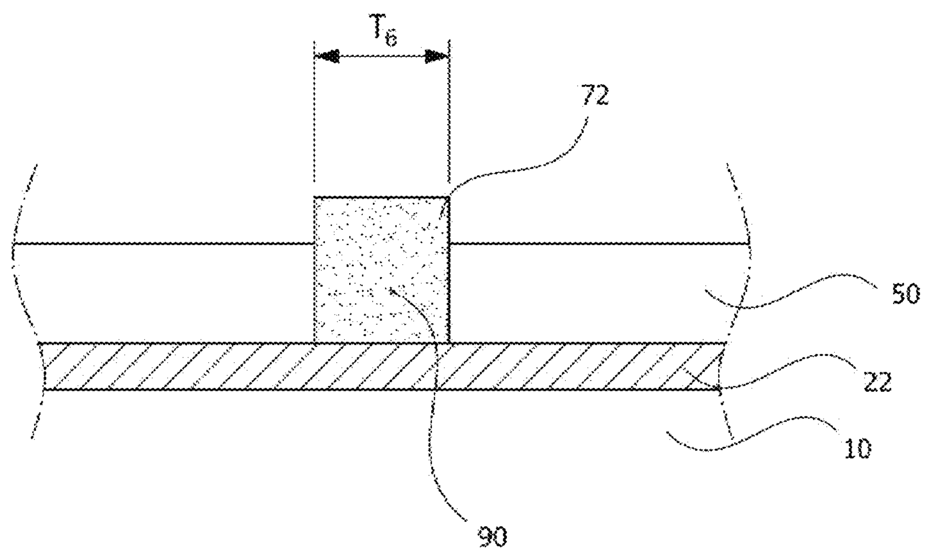

FIG. 9 is a schematic plan diagram showing a touch sensor according to Comparative Example of the present disclosure, FIG. 10 is an enlarged diagram showing a region (S3) of FIG. 9, FIG. 11 a schematic plan diagram showing a touch sensor according to another a Comparative Example of the present disclosure, and FIG. 12 is an enlarged diagram of a region (S4) of FIG. 11. FIG. 13 is schematic cross-sectional diagrams of cutout surfaces taken along lines C-C' and D-D' of FIGS. 10 and 12.

Referring to FIGS. 9 to 13, the touch sensor according to a Comparative Example of the present disclosure has line widths (T5, T6) of the electrode pattern region corresponding to the contact hole 90 equal to critical dimensions (CDs) (T5, T6) of the contact hole 90. According to some Comparative Examples, the line width of the electrode pattern region corresponding to the contact hole may be smaller than the critical dimension (CD) of the contact hole.

There is a problem in that if the line width of the electrode pattern region corresponding to the contact hole is smaller than the critical dimension (CD) of the contact hole, damage to the first electrode layer, etc. may occur during the patterning process of the second electrode layer, and the contact area is not sufficient, thereby reducing the reliability of the device. In addition, as shown in FIGS. 9 to 13, even when the line width of the electrode pattern region corresponding to the contact hole is equal to the critical dimension (CD) of the contact hole, this problem may occur due to misalignment.

Therefore, the present disclosure is technically characterized in that the line width of the electrode pattern region corresponding to the contact hole is larger than the critical dimension (CD) of the contact hole in the first electrode layer and/or the second electrode layer. As described above, the line width of the electrode pattern region may be formed to be larger than the critical dimension (CD) of the contact hole, thereby preventing the damage to the first electrode layer during the patterning process of the second electrode layer, and securing the sufficient contact area even when the alignment is slightly mismatched, and therefore, there is an advantage in that it is possible to maintain the reliability of the device.

Specifically, referring to FIGS. 5, 7, and 8, the line widths (T1, T3) of the electrode pattern region corresponding to the contact hole 90 may be larger than the critical dimension (CD) (T2, T4) of the contact hole 90.

The electrode pattern region corresponding to the contact hole may be a region of the electrode pattern overlapping the contact hole in the planar direction among the electrode patterns formed on the first electrode layer and/or the second electrode layer, preferably, the connection part of the first electrode layer and/or the second electrode layer.

According to one or a plurality of exemplary embodiments, the electrode pattern region corresponding to the contact hole may mean only a partial region corresponding to the contact hole in the connection part in which the contact hole is formed, and may refer to the connection part itself in which the contact hole is formed.

For example, the meaning of only the partial region corresponding to the contact hole in the connection part in which the contact hole is formed may be that the partial region overlapping the contact hole in the planar direction and a peripheral region may be formed to have a step of the line width in the connection part in which the contact hole is formed, and in this case, the electrode pattern region not corresponding to the contact hole may mean the peripheral region.

For another example, the meaning of the connection part itself in which the contact hole is formed may be that the line width of the connection part itself in which the contact hole is formed is formed to be larger than a line width of another connection part in which the contact hole is not formed, and in this case, the electrode pattern region not corresponding to the contact hole may mean another connection part.

However, the method in which the line width of the electrode pattern region is formed to be larger than the contact hole is not limited thereto, and is not especially limited as long as it is possible to prevent damage to the pattern during the process and to maintain the reliability of the device by covering all of the contact holes in spite of the slight mismatching of the alignment.

The critical dimension (CD) of the contact hole may mean the largest value among the critical dimension (CD) values measured in the line width direction of the electrode pattern.

For example, the critical dimension (CD) may indicate the height of the square if the contact hole has a square shape, and indicate the height in a direction parallel to the line width direction of the electrode pattern if the contact hole has a rectangular shape. If the contact hole has an elliptical shape, the critical dimension (CD) may mean the diameter of a long axis or the diameter of a short axis in the direction parallel to the line width direction of the electrode pattern.

The critical dimension (CD) of the contact hole is not especially limited, but is preferably 25 to 55 μm in the line width direction of the electrode pattern region corresponding to the contact hole. In this case, it is possible to secure the sufficient contact area as well as minimizing the parasitic capacitance by electrically connecting the first electrode layer with the second electrode layer, thereby improving the reliability of the device.

The line width of the electrode pattern region corresponding to the contact hole may mean the largest value among the line width values measured in the line width direction of the electrode pattern.

For example, if the partial region overlapping the contact hole in the planar direction and the peripheral region are formed to have the step of the line width in the connection part in which the contact hole is formed, the line width of the electrode pattern region corresponding to the contact hole means the largest value among the values measured in the line width direction of the partial region overlapping the contact hole in the planar direction.

The line width of the electrode pattern region corresponding to the contact hole is preferably larger than the critical dimension (CD) of the contact hole, for example, preferably, 35 to 85 μm. In this case, it is possible to secure the sufficient contact area with the contact hole even in spite of the mismatching of the alignment that may be caused during the process even without affecting the visibility of the electrode pattern, thereby preventing damage to the first electrode layer and improving the reliability of the device.

According to the exemplary embodiment, the line width of the electrode pattern region corresponding to the contact hole may be 10 to 30 μm larger than that of the contact hole, and specifically, a value obtained by subtracting the critical dimension (CD) of the contact hole in the line width direction from the line width of the electrode pattern region corresponding to the contact hole may be 10 to 30 μm. If a difference between the line width of the electrode pattern region corresponding to the contact hole and the critical dimension (CD) of the contact hole is less than 10 μm, it may be unstable due to dispersion during the process, and if the difference exceeds 30 μm, it may be disadvantageous in terms of visibility.

Meanwhile, the electrode pattern region not corresponding to the contact hole may not be formed to be larger than the contact hole, and according to one or a plurality of exemplary embodiments, it may have the line width equal to or smaller than the critical dimension (CD) of the contact hole.

According to the exemplary embodiment of the present disclosure, by forming the base layer, forming the first electrode layer on the base layer, forming the insulating layer including the contact hole on the first electrode layer, and forming the second electrode layer on the insulating layer, the first electrode layer and the second electrode layer are arranged on different layers with the insulating layer interposed therebetween, and the first main electrode and the second auxiliary electrode, and the second main electrode and the first auxiliary electrode are electrically connected, respectively.

According to the exemplary embodiment of the present disclosure, it is possible to omit the bridge electrode, thereby improving the phenomenon in which the bridge electrode is visually recognized.

In addition, it is possible to arrange the respective electrode patterns, holes, spheres, or spaces to overlap with each other in the planar direction, thereby improving the phenomenon in which the electrode is visually recognized.

Specifically, the human visual recognition characteristic represents the human recognition (distinguishing) ability and contrast, and may be expressed as a spatial frequency. The contrast refers to an intensity difference between the tone of a certain portion of an image and the tone of another portion thereof, and the strong contrast of the image means that the difference between the light and dark levels of a specific image is larger than a normal case. In the visibility of the electrode pattern, as the contrast is increased, that is, as the intensity difference between these tones is revealed more clearly, the distinguishing ability according to the human visual recognition characteristic increases in a proportional relationship. In other words, it may be seen that the distinguishing ability for the contrast according to the human visual recognition characteristic may not be expressed as a single function of the spatial frequency, and the distinguishing ability is rather reduced in the highest frequency region and the lowest frequency region of the spatial frequency.

Using these characteristics, according to the present disclosure, when the touch sensor is observed in the planar direction, it is possible to substantially remove the irregularity of the patterns and to uniformize the upper surface of the touch sensor by the high-frequency components not visually recognized by the user, thereby improving the phenomenon in which the electrode is visually recognized.

In addition, the respective electrode patterns, holes, spheres, or spaces may be arranged to overlap each other, thereby suppressing the parasitic capacitance caused by arranging the electrode layer in the thickness direction. In addition, by including the contact hole for electrically connecting the first electrode layer with the second electrode layer in the insulating layer, it is possible to minimize the parasitic capacitance and the resistance of the electrode channel compared to the touch sensor not including the contact hole, thereby implementing the ultra-thin type touch sensor.

Furthermore, the line width of the electrode pattern region corresponding to the region where the contact hole is formed may be formed to be larger than that of the contact hole, thereby reducing the defect occurrence rate due to the mismatching of the alignment that may be caused during the process.

Meanwhile, according to the present specification, the shapes of the respective electrode patterns, holes, spheres, and spaces have been exemplified as a rhombus shape, but are not limited thereto, and may be modified and used like other polygons, such as hexagons, or circles.

<Image Display Device>

The present disclosure provides an image display device including the touch sensor.

The image display device may include a display panel and the aforementioned touch sensor coupled to the display panel.

The display panel may include: a pixel electrode, a pixel defining film, a display layer, a counter electrode, an encapsulation layer, etc., which are arranged on a panel substrate.

A pixel circuit including a thin film transistor (TFT) may be formed on the panel substrate, and an insulating layer covering the pixel circuit may be formed. The pixel electrode may be electrically connected to, for example, a drain electrode of the TFT on the insulating layer.

The pixel defining film may be formed on the insulating layer to expose the pixel electrode to define a pixel region. The display layer may be formed on the pixel electrode, and the display layer may include, for example, a liquid crystal layer or an organic light emitting layer.

The counter electrode may be arranged on the pixel defining film and the display layer. The counter electrode may be provided as, for example, a common electrode or a cathode of the image display device. The encapsulation layer for protecting the display panel may be stacked on the counter electrode.

According to some exemplary embodiments, the display panel and the touch sensor may also be coupled through an adhesive layer. For example, the adhesive layer may have a viscoelasticity of about 0.2 MPa or less at −20 to 80° C. In this case, it is possible to shield the noise from the display panel, and to relieve interfacial stress during bending, thereby suppressing damage to the touch sensor. According to the exemplary embodiment, the viscoelasticity may be about 0.01 to 0.15 MPa.

The image display device may be inserted or mounted into an optical imaging device such as VR equipment, and the aforementioned pixel unit and pixel circuit may be substantially concealed through the holes formed in the touch sensor. Therefore, only desired images may be collected, edited, and modified through the optical imaging device.

Hereinafter, examples of the present disclosure will be specifically described. However, the present disclosure is not limited to the examples disclosed below, but may be implemented in various different forms, and only these examples allow the disclosure of the present disclosure to be complete, and are provided to fully inform those skilled in the art to which the present disclosure pertains of the scope of the disclosure, and the present disclosure may be defined only by the scope of claims.

Example and Comparative Example

Example 1

A first electrode layer including the same electrode pattern as shown in FIG. 1D was arranged on a PET substrate having the thickness of 40 μm. The minimum line width of the first electrode layer was designed to be 30 μm, and the line width of an electrode pattern region corresponding to a portion where a contact hole insulating film is formed was designed to be 40 μm. Thereafter, an insulating layer having the thickness of 2 μm covering the first electrode layer was applied on the PET substrate, and the contact hole of 30 μm×30 μm was formed in the same shape as shown in FIG. 3. Next, a second electrode layer including the same electrode pattern as shown in FIG. 2D was arranged on the insulating layer. Thereafter, the touch sensor according to Example 1 was produced by forming a passivation layer covering the second electrode layer on the insulating layer.

Comparative Example 1

As shown in FIG. 9, the touch sensor according to Comparative Example 1 was produced in the same manufacturing method as in Example 1, except that the line width of the electrode pattern region corresponding to the region where the contact hole was formed produced to be the same as the contact hole.

Experimental Example

<Etching Evaluation and Electrical Property Evaluation>

For the touch sensors of Example 1 and Comparative Example 1, the etching damage of the first electrode layer was evaluated after patterning the second electrode layer, and the evaluation results are shown in Table 1 below.

In addition, for the touch sensors of Example 1 and Comparative Example 1, the resistance and capacitance characteristics of the touch sensors were evaluated by using Q3D simulator from Ansys, and the evaluation results are shown in Table 1 below.

TABLE 1

| Items | First electrode Line width | Contact hole insulating film CD | Second electrode Line width | Overlay Defect frequency | Line resistance (Surface resistance: 9 Ω/□) Tx | Rx | Cm (pF) |
|---|---|---|---|---|---|---|---|
| Example 1 | 40 μm (30 μm) | 30 μm | 40 μm (30 μm) | 0/10 | 101.62 | 101.62 | 0.94 |
| Comparative Example 1 | 30 μm | | 30 μm | 7/10 | | | |

Referring to Table 1, it may be confirmed that for the touch sensor of Comparative Example 1, the defect rate of about 70% is shown due to the dispersion and misalignment of the pattern line width, but for the touch sensor of Example 1, it is possible to adjust the line width of the electrode pattern region of the contact hole forming portion, thereby significantly improving the defect rate during the process.

In addition, it may be seen that there is no effect on the resistance and capacitance characteristics by changing only the line width of the electrode pattern region corresponding to the contact hole, thereby not affecting the performance of the touch sensor even while significantly improving the defect rate during the process.

What is claimed is:

1. A touch sensor comprising:

a first electrode layer comprising a first main electrode and a first auxiliary electrode formed to be spaced apart from the first main electrode;

a second electrode layer comprising a second main electrode and a second auxiliary electrode formed to be spaced apart from the second main electrode; and an insulating layer positioned between the first electrode layer and the second electrode layer and provided with a contact hole, wherein one or more of the first electrode layer and the second electrode layer have a line width of an electrode pattern region corresponding to the contact hole larger than the contact hole, wherein a critical dimension of the contact hole is 25 to 55 μm in a direction of the line width of the electrode pattern region corresponding to the contact hole, wherein the critical dimension of the contact hole refers to a maximum value measured in the direction of the line width of the electrode pattern region corresponding to the contact hole, and wherein the touch sensor does not comprise a bridge electrode.

2. The touch sensor of claim 1, wherein a line width of an electrode pattern region not corresponding to the contact hole is smaller than or equal to the contact hole.

3. The touch sensor of claim 1, wherein the line width of the electrode pattern region corresponding to the contact hole is 10 to 30 μm larger than the contact hole.

4. The touch sensor of claim 1, wherein the line width of the electrode pattern region corresponding to the contact hole is 35 to 85 μm.

5. The touch sensor of claim 1, wherein the contact hole is to electrically connect at least one of a first main electrode and a second auxiliary electrode opposite thereto; and a second main electrode and a first auxiliary electrode opposite thereto.

6. The touch sensor of claim 1, wherein the first main electrode comprises: a first main electrode unit pattern integrally connected by a first main electrode connection part, wherein the first auxiliary electrode comprises: a first auxiliary electrode unit pattern integrally connected by a first auxiliary electrode connection part, wherein the second main electrode comprises: a second main electrode unit pattern integrally connected by a second main electrode connection part, and wherein the second auxiliary electrode comprises: a second auxiliary electrode unit pattern integrally connected by a second auxiliary electrode connection part.

7. The touch sensor of claim 6, wherein the contact hole is formed on at least one of a point where the first main electrode connection part and the second auxiliary electrode connection part opposite thereto intersect in a planar direction; and a point where the second main electrode connection part and the first auxiliary electrode connection part opposite thereto intersect in the planar direction.

8. The touch sensor of claim 6, wherein the first main electrode unit pattern overlaps each of second spheres defined by a plurality of adjacent second auxiliary electrode unit patterns in a planar direction, wherein the first auxiliary electrode unit pattern overlaps each of second holes defined by a plurality of adjacent second main electrode unit patterns in the planar direction, wherein the second main electrode unit pattern overlaps each of first spheres defined by a plurality of adjacent first auxiliary electrode unit patterns in the planar direction, and wherein the second auxiliary electrode unit pattern overlaps each of first holes defined by a plurality of adjacent first main electrode unit patterns in the planar direction.

9. The touch sensor of claim 1, wherein the first electrode layer and the second electrode layer comprise: a mesh-shaped pattern.

10. The touch sensor of claim 1, wherein the first main electrode comprises: a first connection part connecting the first main electrode in a row direction, and wherein the second main electrode comprises: a second connection part connecting the second main electrode in a column direction.

11. The touch sensor of claim 1, wherein the first electrode layer comprises: a first dummy electrode formed to be spaced apart from the first main electrode and the first auxiliary electrode, and wherein the second electrode layer comprises: a second dummy electrode formed to be spaced apart from the second main electrode and the second auxiliary electrode.

12. The touch sensor of claim 11, wherein the first dummy electrode comprises: a first dummy electrode unit pattern, and wherein the second dummy electrode comprises: a second dummy electrode unit pattern.

13. The touch sensor of claim 12, wherein the first dummy electrode unit pattern overlaps each of second spaces defined by a plurality of adjacent second dummy electrode unit patterns in a planar direction, and wherein the second dummy electrode unit pattern overlaps each of first spaces defined by a plurality of adjacent first dummy electrode unit patterns in the planar direction.

14. An image display device comprising:

a display panel; and a touch sensor of claim 1 stacked on the display panel.

* * * * *